United States Patent [19]

Marshall

[11] Patent Number: 5,550,532
[45] Date of Patent: Aug. 27, 1996

[54] METHOD AND DEVICE FOR CONTAINING FUEL SPILLS AND LEAKS

[75] Inventor: Glen R. Marshall, Kingwood, Tex.

[73] Assignee: Shell Oil Company, Houston, Tex.

[21] Appl. No.: 206,292

[22] Filed: Mar. 3, 1994

[51] Int. Cl.⁶ .................................................. G08B 21/00
[52] U.S. Cl. ........................... 340/604; 340/602; 340/618; 73/306; 73/291; 73/49.6; 73/74; 137/312; 137/313; 137/392; 141/86; 141/95; 141/192
[58] Field of Search .................................. 340/605, 618, 340/603, 612, 604; 73/304 R, 290 R, 49.2, 49.6, 74, 291, 305, 306; 137/312, 392, 313; 200/61.04, 61.05; 141/86, 95, 192, 198

[56] References Cited

U.S. PATENT DOCUMENTS

| | | | |
|---|---|---|---|
| 961,216 | 11/1907 | Dow | 137/312 |
| 4,131,773 | 12/1978 | Maham et al. | 200/61.05 |
| 4,163,449 | 8/1979 | Regal | 340/573 |
| 4,497,370 | 2/1985 | Breslin | 166/372 |
| 4,534,651 | 8/1985 | Minikane | 365/440 |
| 4,728,882 | 3/1988 | Stanbro et al. | 204/290 R |
| 4,805,662 | 2/1989 | Moody | 200/61.05 |
| 4,842,163 | 6/1989 | Bravo | 222/40 |
| 4,922,232 | 5/1990 | Bosich | 340/605 |
| 4,971,225 | 11/1990 | Bravo | 222/110 |
| 4,976,869 | 12/1990 | Taylor | 210/644 |
| 4,989,634 | 2/1991 | Rieseck | 137/312 |
| 5,100,024 | 3/1992 | Bravo | 222/40 |
| 5,102,012 | 4/1992 | Foster | 340/605 |
| 5,194,158 | 3/1993 | Matson | 210/651 |
| 5,202,667 | 4/1993 | Alvin | 73/49.2 |
| 5,246,044 | 9/1993 | Robertson et al. | 141/86 |
| 5,281,255 | 1/1994 | Toy et al. | 95/50 |
| 5,301,722 | 4/1994 | Todd et al. | 137/312 |
| 5,341,128 | 8/1994 | Keyser et al. | 340/605 |
| 5,365,968 | 11/1994 | Mills | 137/312 |
| 5,400,924 | 3/1995 | Brodie | 137/312 |

FOREIGN PATENT DOCUMENTS 4116425A  4/1992  Japan .................. 73/290 R

OTHER PUBLICATIONS

Advertisement "4-SITE Veeder-Root Advanced Sensing Technology" by Veeder-Root Environmental Products, 125 Powder Forest Drive, P. O. Box 2003, Simsbury, CT 06070-2003, 2 pp. (Mar. 1993).

Advertisement of "Hydrocarbon Leak Detection Systems" by One Plus Corp., 2 pp.

*Primary Examiner*—Jeffery Hofsass
*Assistant Examiner*—Benjamin C. Lee
*Attorney, Agent, or Firm*—Todd F. Volyn

[57] ABSTRACT

A device and method for containing spills and leaks from fuel handling equipment is provided in which differential sensing means detect the presence of hydrocarbons and nonhydrocarbons such as water. Signals and the responses generated according to them may depend upon the nature and quantity of the substance contained in the device. Signalling may be conducted remotely and excavation and reconstruction of service station grounds is minimized with these devices. In a preferred embodiment, the device is made of unitary construction with the differential sensing means formed as a portion of the surface of a containment vessel.

5 Claims, 2 Drawing Sheets

METHOD AND DEVICE FOR CONTAINING FUEL SPILLS AND LEAKS

FIELD OF THE INVENTION

This invention relates to the collection, detection, and reduction of leaks and spillage of hazardous materials.

BACKGROUND OF THE INVENTION

Avoiding and detecting gasoline that is leaked or spilled during the process of fueling vehicles and servicing fuel storage and handling equipment has become critically important to the operation of service stations. Left unchecked, fuel spillage could seep into the ground and contaminate groundwater. It can also volatilize and add to the presence of pollutants in the atmosphere as well as create a fire hazard. There does not appear to be any shortage of recommended approaches for dealing with these problems.

An early solution to this problem was to dig a pit or trench beneath fuel dispensers, pipes, and storage tanks and line the pits and trenches with a polymeric liner. Access ways and pipes could be placed at low points to determine whether an accumulation of fluid was present. These systems were still subject to volatilization and could also leak. Further, monitoring such a system was generally done periodically with no immediate response to a spill.

Sump boxes and other devices used for the secondary containment of piping and submersible pumps (turbines) have been in existence at least as far back as 1983. Generally, such sump boxes were placed around risers, turbines, and piping joints fixed to the turbines and elsewhere. A leak detector could be placed in such a device and wired into the service station so that the attendant would be signalled to the presence of a leak. These systems were generally nondiscriminating systems. They would sound an alarm irrespective of the liquid which would fill the box. Thus, a rise in groundwater, heavy rain, or water runoff was just as likely to sound an alarm as would leaking fuel.

U.S. Pat. Nos. 4,842,163, 4,971,225, and 5,100,024 are drawn to Gasoline Collector Pit Boxes and Submersible Unit Boxes. These patents describe containment devices that were an early response to the rising need for secondary containment strategies largely driven by regulatory schemes set forth by State and local governments. Essentially, they describe containment pans that were placed beneath dispensers or around turbines. In most embodiments, the devices had a slanted floor with a well at the low point. Spillage or leakage would thus collect in the low point. A bracket was pivotally mounted to the floor of the containment pan. A float was rigidly attached to one end of the bracket with a chain attached opposite to the float. The chain was then placed in mechanical communication with a trigger on a shear valve for shutting down the flow of fuel through the dispenser. The float rested in the low point of the containment pan. When liquid filled the low point of the pan, the float would rise, pulling on the chain and tripping the shear valve.

The combination of tripping the valve, shutting down the flow of fuel, and recognizing that this had taken place was said to result in the generation of an externally manifested signal. While other embodiments of these devices existed, they all relied upon such a mechanical action or direct physical force for the actuation of the signal and the response to that signal. For this reason and others, the devices and methods set forth in these patents left many problems unsolved. For example, the reliance on a mechanical link between the float (sensor) and the shear valve proved difficult to properly set and maintain. Furthermore, because hydrocarbons have a specific gravity that is less than that of water, it was difficult to provide a float which would work well in both hydrocarbons and water or a mixture thereof. Moreover, the only externally manifested signal provided by these devices was the recognition that a dispenser or pump was no longer operating. Clearly, there is no guarantee that such a recognition will occur in a timely manner.

Another difficulty with the systems described in these patents was that the devices used in conjunction with gasoline dispensers all had a drainage means as part of the containment pan. This drainage means drained accumulated fluids through another underground line such as the vapor recovery system common to most service stations. If one is interested in secondarily containing the system then they should also provide a system for containing the drainage means. Additionally, when the drainage means is combined with the vapor recovery system one risks returning dirty or fouled fuel and water to the fuel tank. Further still, some regulatory bodies will simply not permit such an arrangement.

Spills and leakage can also arise from heavy inadvertent contact with fuel dispensers. Typically such dispensers are large rectangular objects placed between service station driving lanes. Periodically, these dispensers will be struck by a vehicle negotiating through the lanes. Prior art methods for dealing with this problem have generally involved the placement of a shear valve between the source of the fuel (lines coming in from the storage tank) and the dispenser. When the dispenser receives a large jolt, the shear valve is tripped shutting down the flow of fuel to the dispenser. Again, there is no way to guarantee that an attendant or one responsible for maintaining the system will be alerted that this will occur. The disablement of the dispenser by mechanical means is also not as reliable or as quickly actuated as desired. An improved sensing and signalling means for such an event would add greatly to the integrity of the safety and environmental protection posture of the service station.

Those involved in formulating secondary containment strategies have not generally confronted the issue of the danger of volatilization of the fuel contained. Devices used for this purpose have generally focussed on directing spillage to a low point, a well, or other area in which accumulation of small amounts of fluids could be sensed. This allows rapid detection of fluid that is accumulating but requires some accumulation nonetheless. When this occurs, fuel can volatilize and become a much more potent fire and explosion hazard than would be the case if the fuel remained a liquid. Detection methods that do not require accumulation of fuel could help avoid this problem. Of course, where some nonhazardous fluid such as water is accumulating in the containment device one would not necessarily want to cause an alarm. Thus, an ideal system would respond immediately to the presence of fluid, would distinguish between hazardous and nonhazardous substances, and would provide an appropriate signal or response depending upon the nature of the substance and the type of response desired.

Retrofitting service stations with new electrically controlled sensors, monitors, and containment devices can be a costly and disruptive undertaking. Most service stations have concrete, cement, or asphalt accessways for the vehicles using the stations. These accessways cover the areas that contain electrical connections and many of the devices used to store fuel and get it to the dispensers.

Changes requiring new electrical connections and devices could require substantial excavation, trenching, wiring and other intrusive operations. Of course, excavated areas would also have to be resurfaced. Avoiding this type of expense and trouble in the installation of new devices and sensors would also greatly benefit this area.

It will also be understood by those skilled in the art that there is a fairly heavy flow of information and many monitoring requirements associated with operating modern service stations apart from avoiding leaks and spills at the dispenser and pump. Storage tanks must also be monitored for leaks. Most modern service stations employ double wall storage tanks having an interstices between the walls. A number of different sensing technologies may be employed to monitor this interstitial space to determine whether there is leakage in the tanks. This information must be communicated when such a leak occurs.

Inventory control and other accounting and financial data is also compiled by the service station attendant. The level of the fuel in the tanks must be monitored so that inventory and supply can be controlled without interruption. As point of sale devices and microprocessors make inventory control increasingly continuous, this information multiplies. For example, it is possible to detect fuel usage, inventory, and sales by reconciling point of sale data, storage tank volume, receipts and other information. Increasingly stringent accounting control requirements require just such a reconciliation. Integrating the input from fuel storage and handling devices and other data sources could streamline this process so that most of the information required of the attendant can be obtained through one source. This would simplify service station operation and also add to the safety of such operations.

Another complication brought upon by the changing face of service station operations is the nature of the response to an alarm or signal that spillage and leakage has occurred. Fewer personnel now staff service stations on a full time basis and fewer still have technical expertise. Thus, it would be beneficial if a potential environmental or safety problem could be remotely signalled to a centralized agency capable of handling solving such a problem. For example, rather than waiting for an attendant to recognize that a large spill of gasoline has occurred, having the attendant evaluate the significance of the spill, and then alerting an agency capable of solving the problem, time and undue hazard could be saved by having a signal sent directly from the system under alarm to a response agency. Such a signal might also be sent to the fire department, a central monitoring facility, and any other interested location. Of course, it would not be helpful if every time a sensor sensed anything such a response was solicited. Thus, to be meaningful, such a system should be able to differentiate among the different sources of alarm generation and the relative severity of the source. The appropriate signal should then be sent to match the type and severity of the source of the problem.

Some of the problems noted above are addressed through system automation as set forth in application Ser. No. 08/206,291 filed on the same date as this application, entitled "Improved Site Management System for Containing Hazardous Spills and Leaks," by inventor Glen Marshall which is incorporated herein by reference. Human judgment should also not be without recourse. If an attendant receives information, from a sensor, signal, or elsewhere that continued operation of a dispenser, pump, or other fuel handling device would create a safety or environmental hazard, that attendant should be able to remotely disable the device. Response time to such information could be greatly reduced if sensor signals and controls were all centrally located.

Statistical treatment of the information generated by remote sensing means can also add to the quality of human judgment and decision making. For example, historical data concerning times and dates of spills and differentiation of the types and quantities of liquid present in containment devices can greatly contribute to the treatment of various problems. Perhaps fixtures used in association with dispensers are tightly sealed at relatively high temperatures but become loose and leaky at lower temperatures. Alternatively, containment devices may fill with fluid more readily when humid air is rapidly cooled and thereby condensed. Distinguishing occurrences such as these from mechanical failures and other mishaps could greatly aid in identifying and using the appropriate equipment for the given conditions. Accordingly, it would be beneficial if a system could be developed which avoided the problems outlined above and compiled and processed data gathered through the operation of the system.

SUMMARY OF THE INVENTION

It is an object of this invention to provide a device for containing spillage and leaks from fuel storage and handling equipment.

It is a further object of this invention to provide a device for containing spillage which produces an appropriate response to the spillage such as signalling the event to an attendant or disabling the offending equipment.

It is a yet further object of this invention to provide a device for containing spillage and leaks from fuel handling and storage equipment which can be remotely monitored and easily retrofitted to service stations without substantial excavation and wiring.

It is a yet further object of this invention to provide a method for containing spills and leakage and selectively providing signals and responses to the presence of hydrocarbons or a predetermined amount of nonhydrocarbon.

It is yet a further object of this invention to provide a device for containing spillage which produces signals which can be integrated into a system for containing leaks and spills in fuel handling and storage equipment wherein signals of spills, leaks, and impacts of such equipment are marshalled at a remote location, an appropriate response is automatically undertaken or the need for one is remotely communicated and analysis of such events is continuous and processed on site.

It is yet a further object of this invention to achieve all of the aforementioned objects of this invention without substantial excavation of facilities employing new containment devices.

In accordance with these and other objects of this invention, device for containing and responding to spillage and leaks associated with fuel handling equipment is provided. This device has a spillage containment vessel placed beneath the fuel handling equipment with a substantially open top portion with the remainder being substantially sealed. At least one nonmechanical differential sensing means is in the vessel and there is a signalling means as well. A means for substantially instantaneously disabling the flow of fuel through the handling equipment is also part of the device. Actuation of this disabling means and the signalling means is provided by a nonmechanical communication from the differential sensing means in response to the presence of fluid in the vessel pan.

The device may comprise different sensing means capable of distinguishing nonhydrocarbon from hydrocarbon and may cause different signals or responses to the detection of either. Signals may be generated remotely and may be analyzed by a microprocessor which can capture historical data and conduct trend analysis. A sensing means may also be used to detect, signal, and actuate a response to an external force on the handling and storage equipment. Remote disablement of the affected equipment may also be initiated in such a device.

A method is also provided for responding to spillage and leaks associated with fuel handling equipment. This method includes the steps of 1) containing spills and leaks from the equipment in a containment vessel placed beneath it, 2) actuating at least one nonmechanical sensor placed within the equipment in response to the presence of fluid within the containment vessel, (the actuation resulting in at least one nonmechanical communication from the sensor), 3) substantially simultaneously disabling the equipment in response to the nonmechanical communication from the sensor, and 4) remotely signalling the presence of fluid in the containment vessel.

PIG. 5 is a schematic cutaway side view of an embodiment of the instant invention wherein the unitary construction of the containment vessel comprises the differential sensing means.

DETAILED DESCRIPTION OF THE INVENTION

The instant invention comprises novel containment devices and methods that distinguish among the source, nature, and severity of a leak or spill of fuel and other fluids, provides an appropriate response or signal locally or remotely and can be integrated into a system which compiles historical and analytical data relative to such events, and integrates all of these functions with other service station operations such as inventory control.

The containment devices and methods of this invention incorporate containment vessels which contain leaks, spills, and other fluids emanating from dispensers and other fuel handling equipment they are place beneath or in concert with. However, the containment vessels used in this system are "smart" systems. That is, they have sophisticated discriminating sensing means which may be used as components in such vessels or may actually be an integrated element of the vessel itself.

Figure 1:
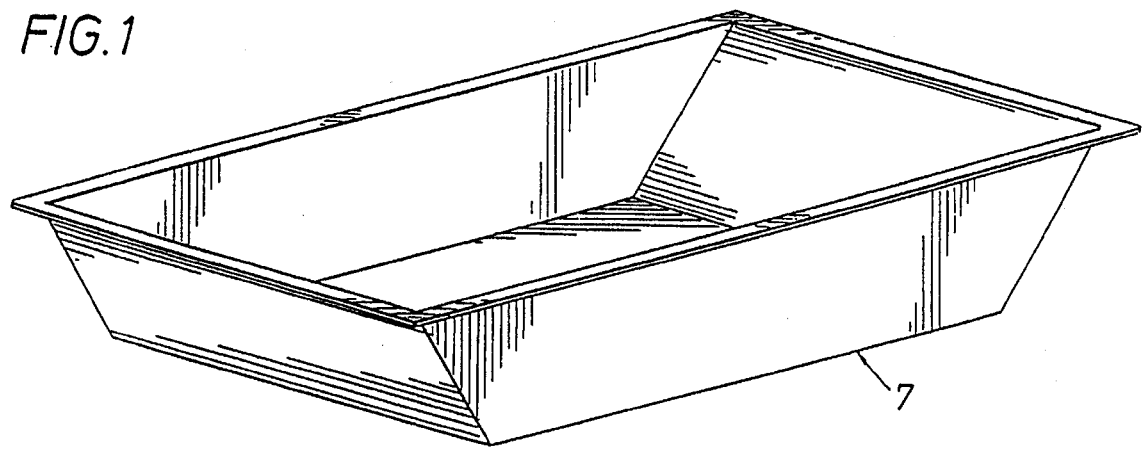
FIG. 1 is an isometric view of a trapezoidal embodiment of the containment vessels of the instant invention.

Past containment vessels have emphasized that the bottom or floor should slope to a low point or well so that a sensor placed therein could detect fluid accumulations more rapidly. While such a design can still be employed in the vessels of this invention, it is not required. A preferred embodiment of this invention incorporates a containment vessel which appears generally as a three dimensional trapezoid having its major leg on top (towards the surface). The top of the vessel is open so that fluid may enter the vessel but the remainder of vessel is substantially encased/enclosed. FIG. 1 shows such a containment device. Construction may be of any material that is impermeable to hydrocarbons. This may include steel, sheet metal, high density polyethylene and other well known polymers.

The preferred containment vessel has a generally rounded concave interior portion directed away from the device producing the spills or leaks. This may be accomplished through proper molding of the vessel or may accomplished by means of an insert placed in the interior of the vessel. A flame arresting element such as "FLASHGARD" (A trade name of Scott Paper Co.) can be installed in the containment vessel. Preferably, this should be at the top (directed towards the dispenser) of the containment vessel.

Figure 2:
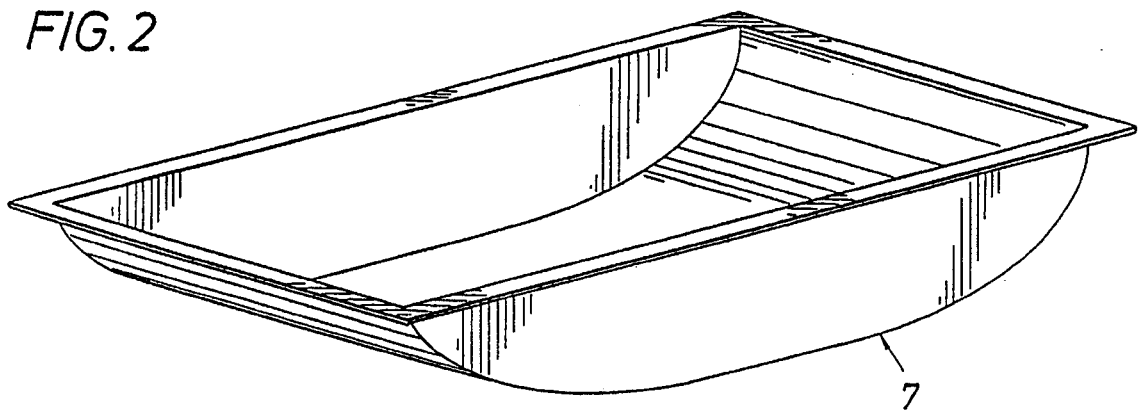
FIG. 2 is an isometric view of another embodiment of the containment vessels of the instant invention.

It is also possible to have the containment vessel itself shaped substantially as a hemisphere. FIG. 2 shows such an embodiment. This is not preferred since the trapezoidal shape allows the vessel to be easily emplaced and removed from beneath the concrete islands in which they are generally mounted. An accessway is provided to the vessel so that if fluid accumulates in it, the vessel may be emptied by a thief pump or other device. In a preferred embodiment of the invention, the vessel itself is entirely removable so that an attendant can simply lift out the vessel and pour out its contents into a disposal vessel.

Figure 3:
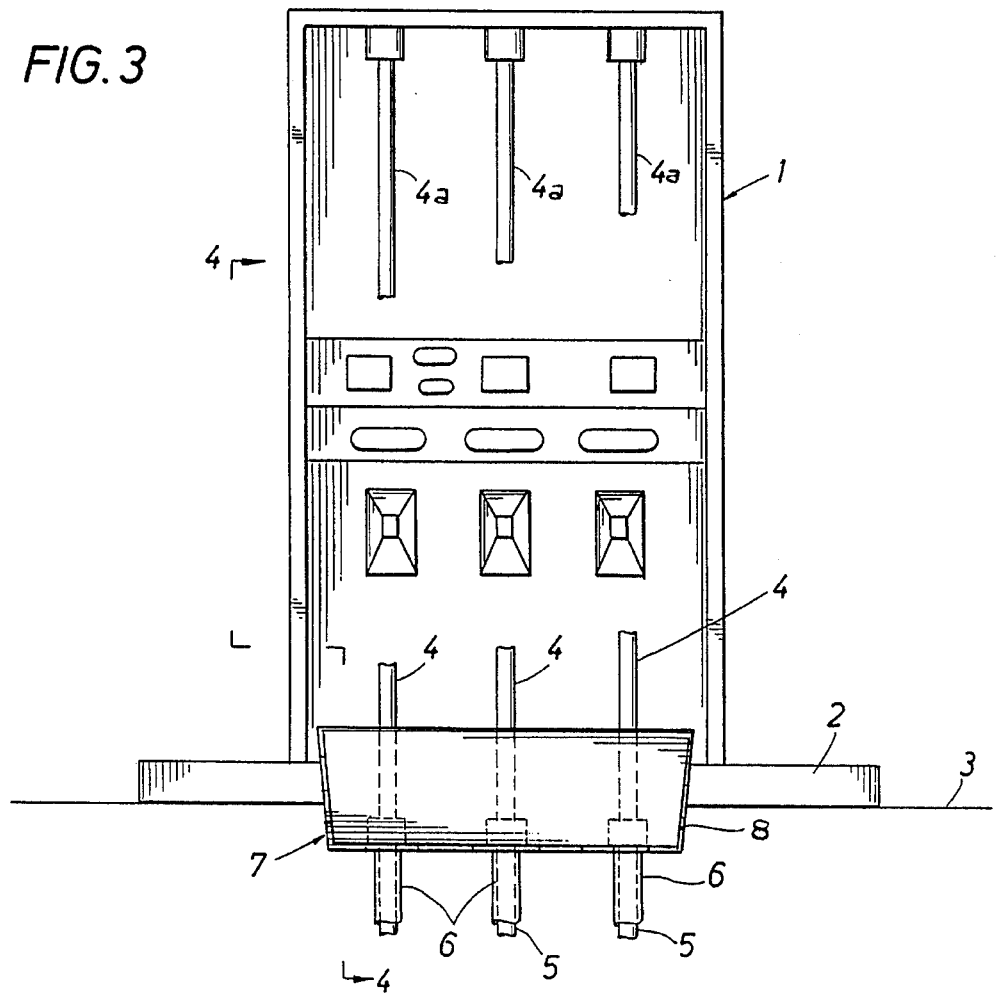
FIG. 3 is a front view of a typical gasoline dispenser.

FIG. 3 shows a front view of a gasoline dispenser. The dispenser, 1 is placed atop an island, 2 which lies atop grade, 3. Fuel supply lines, 5 run from storage tanks and pumps (not shown) into the dispenser, 1 so that customers may obtain gasoline through hoses, 4a and attached pump nozzles (not shown). The lines, 5 are contained in containment piping, 6. Containment vessel, 7 is placed beneath the dispenser so that leaks and spills are captured therein.

Figure 4:
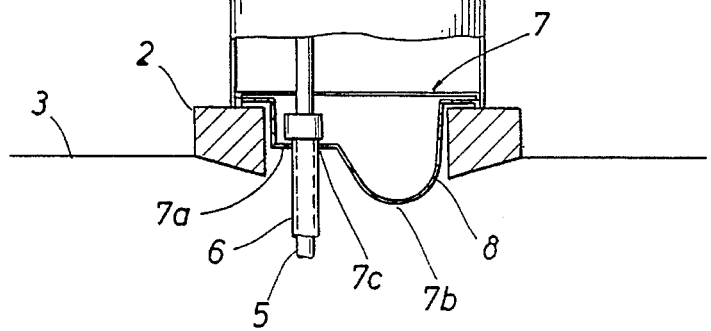
FIG. 4 is a cutaway side view of the gasoline dispenser of FIG. 1 showing an embodiment of the devices of this invention.

FIG. 4 shows the placement of the containment vessel 7 in more detail. In this embodiment, vessel, 7 is sloped away from the supply lines, 5 and containment piping, 6 running from beneath the dispenser, 1 into its body. This is accomplished by making the side of the containment vessel closest to these fixtures, 7(a) shallow. The portion of the containment vessel which actually contains the leaking or spilling fluid, 7(b) lies next to this area with the shallow end pointed toward it. The shallow portion 7(a) of the vessel can contain a sealable slit 7(c) and may be drilled or cut out so that the vessel is inserted around lines, 5. Once in place, the area that has been split is sealed with any of the well known hydrocarbon resistant seals. Containment vessels of this type have the advantage of being placed closer to the surface and are therefore more easily reached by maintenance personnel. They are also easier to replace than previous devices.

At least one differential sensing means, 8 is within the containment vessel. As used throughout this specification, a differential sensing means is one which can detect at least two different analytes and can distinguish between them. It is preferred that differential sensing means be capable of sensing and distinguishing more than two analytes. For example, a preferred embodiment sensing means differentiates among two different grades of gasoline and water. It is further preferred that differential sensing means be capable of sensing such analytes in both the gaseous and liquid states and that they are able to detect and communicate the quantity of such analytes sensed.

When fluid enters the vessel as from a leak or spill, the differential sensing means detects its presence and communicates at least one signal. If hydrocarbons are sensed, this signal is communicated to a service station attendant. Signalling occurs through a signalling means which is actuated by the sensing means. For example, if the sensor detects a change in the capacitance of a circuit due to the presence of a hydrocarbons the signal may be communicated by an ammeter electrically attached to the circuit.

The communication can also actuate a disabling means. As used in this specification, a disabling means is a circuit or device used to disrupt the operation of a device used to handle/deliver fuel. In the case of the typical fuel dispenser, the disabling means comprises a switch which, upon the communication of the detection of hydrocarbon, cuts electrical power to the dispenser so that fuel can no longer be delivered.

If water or other nonhydrocarbon materials (such as thin mud) are detected, a signal is sounded but such a signal is in the nature of a warning. The presence of a small amount of rain water or other non troubling substance may not warrant disabling the dispenser, so the attendant is merely warned to examine the situation. In a preferred embodiment, the volume of water or other nonhydrocarbon is also communicated to the attendant. This is described more fully below.

The hydrocarbon sensing means used herein may employ any number of technologies to detect and signal the presence of hydrocarbon fluids provided they are not mechanically actuated. As used throughout this specification, by mechanical actuation it is meant that a physical and mechanical action of the substance is directly transduced into a signal by a mechanical action of the sensor. The hydrocarbon sensing means of this invention either do not rely upon physical and mechanical actions of the substance or do not directly transduce a signal by a mechanical action of the sensor in response to such an action. This is referred to as nonmechanical actuation. Likewise, a nonmechanical communication between the sensing means and signalling means occurs when a signal is generated and received without the use of a physical and mechanical link between the sensing means and the signalling means. Nonlimiting examples of nonmechanical actuations and communications include electrical, magnetic, sonic, and optical actuation and communications.

Sensing means which may be used in this invention include without limitation: capacitance sensors, conductivity sensors, sensors that employ a remote nonmechanical signal in response to a rise in fluid level such as through magnetic effect (e.g., the Hall Effect), optical and electrooptical sensors, chemical sensors, infrared emitter/receivers, radio frequency transmitter/receivers, electrical imposition and detection of a modulated signal on existing signals (e.g., on electrical lines), ultrasonic detection and other nonmechanically actuated sensors.

The differential sensing means can be comprised of one or more sensing elements to distinguish or determine the types of substances entering the containment vessel. Indeed, such a sensing means may actually incorporate a multiplicity of sensing elements.

For example, one sensing element of a differential sensing means may be a conductivity based sensor coated in a hydrocarbon permeable substance. The "LEAK EDGE" (a trade name of McKee Construction, Inc. of Joplin, Mo.) hydrocarbon leak detection sensor, is an example of a sensor which incorporates a sensing element encased in hydrocarbon permeable polymer. When a hydrocarbon permeates the coating, electrical current flowing through the sensing element is altered and a signal is actuated. Of course, since water is a nonhydrocarbon it will have no such effect. Thus, if groundwater enters the vessel but no leakage of fuel accompanies it, no signal is generated. Stills, it is desirable to detect the presence of water so that when the vessel is filled the containment strategy is not then defeated by leaking fuel being washed out of a vessel that is already filled. This may be accomplished by employing a sensing element specific to nonhydrocarbons such as water.

Nonhydrocarbon sensing elements may be mechanically or nonmechanically actuated provided that they do not also detect hydrocarbons. One way of accomplishing this is through the use of a float device which will float only under a specific gravity not found in hydrocarbons (e.g., a specific gravity of 62.4 $lb/ft^3$, the specific gravity of water). It will be recognized that fluids in which such a sensor float is placed will be present at a level that is higher than is the float if such fluids have a lower specific gravity than the one in which the device is designed to float. One skilled in the art will recognize that floats should generally be crafted to float on fluids having a specific gravity that is greater than about 50 $lb/ft^3$ which is generally about specific gravity of most gasoline blends. One skilled in the art will also understand that refinements my be required to adjust for different temperature and weather characteristics of the area in which the device will be used.

In another preferred embodiment of this invention, a sensor is used which can optically determine and distinguish the type and quantity of substance entering the vessel. One such means is a sensor which incorporates a wave guide or fiber optic component. Such a component is positioned in the vessel so that it will contact the fluid entering the vessel at it sensing element. Light enters the component and is reflected against a surface in communication with a means for receiving and communicating the signal it is receiving. When a substance enters the vessel it scatters or interferes with the optical signal transmitted through the fiber. A simple optical sensing means will simply distinguish signal from nonsignal/interference and transduce a response to such a detection. However, preferred sensing means will detect the amount and type of scattering or interference and transmit this information back to a microprocessor. This signal will then be used to determine the nature of the substance present, its physical state, and how much is present. Those skilled in the art will appreciate that this can be done with any number of analytical techniques such as solutions of the Rayleigh Equation and derivations thereof. Ultrasonic sensing elements can be fashioned using essentially the same principle.

Figure 5:
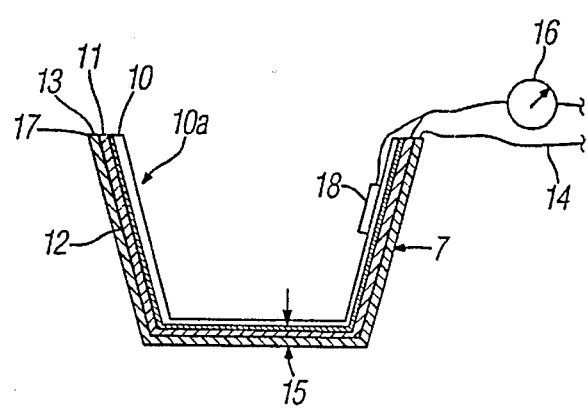

In another preferred embodiment of this invention, as shown in FIG. 5, the containment vessel incorporates one or more sensing means as an intrinsic portion of its construction. One example is when a vessel, 7 constructed of molded thermoplastic is laced with a conductivity based sensing element, 15. This embodiment incorporates a coating, 10 by a hydrocarbon permeable/nonhydrocarbon substance. In such a configuration the entire inner surface of the vessel is a hydrocarbon sensor. The containment vessel, 7 can, for example, comprise one unitary capacitance based sensor. One means of constructing such a vessel is to use multiple layers of different charge sensitive coatings such as by coating very thin wire mesh with polytetrafluoroethylene. The base layer, 17 of the vessel, 7 comprises a hydrocarbon impermeable substance such as steel or high density polyethylene. The next layer is, for example, an anodically charged layer, 13, in electrical communication with a device outside the vessel.

The layer, which is fixed atop such an anodic layer is a dielectric, 12 comprised of any substance that is miscible with hydrocarbons. Alternatively, the dielectric can be present in quantities so that hydrocarbon permeating the anodic layer and entering the dielectric layer displace the dielectric and occupy the space between the anodic and cathodic layers. As described below, the dielectric has a different dielectric constant than that found in hydrocarbon blends found in gasoline. Air will work well in this capacity.

The layer atop the dielectric layer, 12 is a cathodic element, 11 in electrical communication with a device outside the vessel The layer atop the cathodic element, 11 is a hydrocarbon permeable but nonhydrocarbon impermeable layer, 10. Leads, 14 extend from each of the conductive layers, 13, 11. A small amount of electricity is supplied to lead, 14. While wire leads are shown, it will be appreciated by those skilled in the art that such leads, 14 need not be metal wire. In a most preferred embodiment, the total of the layers that lie atop base layer, 17 is very thin much like a simple circuit board commonly found in electronic applications. The leads, 14 are then simply ohmic connectors such as the conductive metal interconnections commonly found in monolithic integrated circuits.

The charge applied through leads, 14 is selected so that capacitance is not overcome by the dielectric, 12. When hydrocarbon permeates coating, 10, it displaces dielectric, 12 and, having a different dielectric constant, allows a circuit to be completed. A sensing element, 16 which can detect current or a completion of the circuit is then actuated. This sensing element, 16 thereby generates a signal which is communicated to an attendant and/or used to actuate a disabling means. In a preferred embodiment this signal is communicated to a central processor of a site management system as disclosed in co-pending application Ser. No. 08/206,291, entitled "Improved Site Management System for Containing Hazardous Spills and Leaks," inventor Glen Marshall. The nonhydrocarbon sensing element 18, such as the float sensor, can be affixed to the inside of the vessel 7 in the manner currently practiced in the art for emplacing such devices.

The electrical charge placed on the charged layers is small. Small commercially available batteries can be used for this purpose or the device may be powered by existing or added electrical lines. The wires, leads, and other electrical circuitry used are all made of intrinsically safe design so that no sparks or arcs are created.

In an alternative embodiment, a charge is applied to the leads, 14 so that the addition of analyte (hydrocarbon here) merely alters an existing conductance across the layers, 13, 11. Thus, even if the dielectric constant of the dielectric layer is lower than that of the analyte, an ammeter or other sensor detecting the current across the layers will detect a perturbation as the analyte enters the space between them. This can be modulated to transduce a signal that provides information about the quantity or type of substance that has permeated the coating, 10.

Coatings, 10 can be applied using well known coating methods. The techniques disclosed in U.S. Pat. 5,194,158 (incorporated herein by reference) can be readily adapted to provide the surface of the containment vessel with such coatings. There, various membranes were disclosed for the selective removal of radon from water and air. Membranes which would allow hydrocarbon to permeate but not allow water to permeate were also described and were suggested as a means for selectively removing volatile organic compounds from groundwater as well. Such materials include, without limitation, polydimethylsiloxane and block copolymers of it with bisphenol-A-polycarbonate such as is found in "LEXAN" brand polymer (a trade name of General Electric). They may be extruded, coated, or cast into the form of thin films, flat sheets, using a variety of techniques well known in the art. Microporous membranes such as polytetrafluoroethylene (PTFE) and polypropylene such as is found in "CELGARD X10" and "CELGARD X20" brand polymers (trade names of Hoechst-Celanese) also display the desired permeability properties.

Coating layers of about 10 microns will generally accomplish the objects of this invention. One skilled in the art will recognize that the proper coating thickness is dependent upon the material used and the amount of time required for permeation. Preferably, a coating thickness is selected such that the minimum hydrocarbon content that is detectable to the sensing element can permeate the coating and contact the sensing element after less than a minute of contact with the coating. More preferably, the thickness is selected so that the hydrocarbon permeates the coating in less than 10 seconds. In a most preferred embodiment of this invention, hydrocarbon permeation is almost immediate so that sensing and signalling of the presence of a leak occurs substantially simultaneously. Adjusting coating compositions and charge to achieve the desired permeation time and quantity of analyte needed is within the state of the art in coatings and sensing technology.

In order to achieve the rapid permeability of the coating layers and yet avoid damaging the coating, 10, a protective layer, 10a can be added. This protective layer is comprised of any material that is permeable to the substance to be sensed. Its function is merely to protect the coating, 10 and it should therefore allow the analyte to penetrate the coating, 10 very rapidly. It is also irrelevant whether or not this protective layer, 10a is impermeable to materials that are not to be sensed. Thus, while coating 10 can be made very thin to allow rapid and selective permeation, protective layer, 10a can be made thick. Layers of 75 microns and greater can be used. This is particularly true when, for example, the layer, 10a is made of a cloth.

In another embodiment of this invention, the containment vessel is again the sensor itself. However, in this embodiment the coatings used are permeable to water but not hydrocarbon. Again, the substance that separates these layers has a greater dielectric constant than the analyte but in this case the analyte is water. The methods and techniques found in U.S. Pat. No. 4,976,869 (incorporated herein by reference) can be applied here to achieve this purpose. Essentially, these coatings are comprised of cuproammonium and cellulose as this combination is known to resist hydrocarbons' degradation and allow water permeation.

When these coatings are used, the sensing means detects only the presence of water and not hydrocarbon. It may be desirable to merely sound an alert that water is in the containment vessel without disabling the dispenser. Of course, it will still be desirable to disable the dispenser when hydrocarbons enter. A hydrocarbon sensing means can be made to lie at the bottom of the containment vessel. Such a sensing means can float on the water if constructed from a hydrocarbon permeable fabric, for example. In this way, water can fill the container to a predetermined level and yet the dispenser will only be disabled when hydrocarbon, which will float on the water, enters the system.

It will also be understood that this unitary vessel/sensing means design is not limited to capacitance based sensing. Resistance, conductance, electro-optical, infrared, ultrasonic, optical and other methodologies can be used in the same general manner. For example, it is also possible to adhere leads and detectors for fiber optical sensing means directly into the containment vessel. Any number of fiber optical strands can be so adhered but at least one should be adhered to the bottom or floor of the containment vessel, 7 with the emission of light being upward (toward the dispenser). A sensing means sensitive to the frequency of light emitted can then be placed in a position to receive the light emitted by the strand. Light scattering indicative of hydrocarbon can be used to signal the presence of hydrocarbon or other analyte. Again, one may employ such a sensing means as merely an "on-off" switch or it may be used to supply more discriminating information. Fiber optical sensing means of this type are also useful for detecting gaseous or vaporous hydrocarbons.

This unitary design of vessel/pan itself solves two problems not addressed in the prior art. First, it can detect the presence of any quantity of hydrocarbon without the need for directing leaks and spills to a low point on the vessel for accumulation. Any contact of hydrocarbon to the surface of the containment vessel will signal a leak or spill. Hence, the vessel becomes truly shape independent. Secondly, the design reduces fire and explosion hazards by rapidly detecting hydrocarbon before a quantity can accumulate, volatilize, and create a fire and explosion hazard. The addition of other sensing means to detect nonhydrocarbons can aid in the differentiation of type and quantity of substances entering the vessel. Additionally, this same design can be applied to pods surrounding mechanical devices associated with removing, pumping, and handling fuel elsewhere such as in tank turbines, risers, and fill tubes.

A further measure that can be taken to aid in the use of unitarily constructed vessels/sensors is to make them removable. A small but sensitive vessel of this type can be shaped so that it can be easily removed from an emplacement beneath a dispensers for example. The vessel may be made of any shape. The trapezoidal shape is a preferred shape as are any inwardly sloping, conical, or partially conical vessels. When an alarm is sounded and the problem is addressed, the containment vessel can be removed and emptied. If the vessel contains a sensing element coated with a hydrocarbon permeable substance it can be dried and cleaned so that hydrocarbon can is removed without degradation of the coatings. Having a store of several such containers would make such a system quick and easy to service and maintain.

The system of the instant invention allows relatively easy and inexpensive retrofits of existing service stations. Excessive conduits and wires that run through those conduits do not need not to be employed with these dispenser monitoring systems. Integrating the signals of such a system merely requires capturing the incidental emissions of the sensor system used. This is most easily done by capitalizing on the Hall Effect or induced magnetic field that accompanies the electricity needed to operate the dispenser.

Most dispensers require some current to operate. At a minimum, electricity is need to light up LEDs and operate the internal circuitry. Dispenser containment vessels can be retrofitted beneath the surface with hydrocarbon/nonhydrocarbon discriminating sensors contained therein. When the sensor detects a liquid, a low voltage, intrinsically safe DC current is generated in a potted electronic circuit box. A different voltage current is generated in response to a detection of hydrocarbon. A Hall Effect sensor located nearby detects the magnetic field associated with the generation of the electric current, distinguishes the field strength or the modulation thereof, and communicates this information to the processor. The processor is programmed to produce a different response and signal for different field strength signals and their modulations. Thus, for example, an alarm signal can be generated for the detection of a low level of water but both an additional alarm and disabling the dispenser can be induced from the detection of any hydrocarbon or a high level of water. Remote communications can be so conducted by the sensation of any emission incident to the actuation of the sensor being used. This same indirect communication can be conducted when the containment vessel is one which intrinsically incorporates the differential sensing means as part of its construction.

Another aspect of the integrated approach of this invention is the ability to include any number of additional remote sensing means. One example of such a desirable remote sensing means is a vehicular impact sensors. These sensing means are used to detect an incident in which any dispenser or suction pump is struck by a vehicle. In a preferred embodiment of this invention, the first response of such a sensor is to instantaneously disable the dispenser by disconnecting electrical power to it. This will eliminate a source of ignition for fuel that may be present or spilled as a result of the incident.

In the most preferred embodiment, the sensor is sensitive primarily to force applied in one direction. For example, if it is mounted vertically, it should be very sensitive to vertical movement but relatively insensitive to horizontal movement. This helps reduce false alarms from vibrations, inadvertent nudges, and the like. The sensor is ordinarily mounted directly to the dispenser and indeed is mounted to be sensitive to vertical movement since this is the expected type of movement in a vehicular collision. A concern here is that residual capacitance not be allowed to generate a spark that can ignite any spilled fuel that may now be accessible. This can be avoided by extending a coil of ground wire from the pump. The coil is sufficiently wound and of sufficient length so that the charge on the dispenser is fully dissipated before it can be fully extended and breaks.

Conventional accelerometers can be used as vehicular impacting sensing means. These devices detect motion primarily in one direction and are small enough to be integrated into the devices herein claimed and described. Thus, for example, a given signal or the cessation of a signal can be detected by a Hall Effect sensor and communicated to a central processor so that the dispenser is disabled and an attendant is alerted.

While the remoting aspects, automatic control, and automatic response of this system are important, so too is the ability to interject human judgment to correct, supplant, or override the system when necessary. To accommodate this function, the control of this system can be selectively overridden. For example, it may be desirable to disable a dispenser despite the fact that no product or impact has been sensed. An attendant can pass a signal to the disabling means through a switch or central processor which controls all sensors, alarms, and disabling means. Actuation of the disabling means then interrupts the flow of electrical current to the device causing it to cease operations.

Construction and fabrication methods that are used in this invention can include the use of solid state components for all sensors so that ignition sparks are avoided. This can easily be achieved by using intrinsically safe components and methods as set forth in the National Electrical Code per NFPA-70, for example.

I claim as my invention:

1. A device for containing and responding to spillage and leaks associated with fuel handling equipment comprising:

a spillage containment vessel placed beneath the fuel handling equipment, said vessel having a substantially open top portion, said containment vessel further having an interior surface and an exterior surface, said interior surface being substantially sealed;

differential sensing means within said vessel comprising hydrocarbon and fluid sensing elements which separately sense hydrocarbon and nonhydrocarbon, at least the hydrocarbon sensing element of said differential sensing means intrinsically incorporated in the construction of said interior surface of said containment vessel such that it comprises the entirety of the interior surface of said vessel;

a signalling means, signalling means being in nonmechanical communication with at least said hydrocarbon sensing element of said differential sensing means and being in further communication with said nonhydrocarbon sensing element of said sensing means such that the differential sensing of hydrocarbons and nonhydrocarbon is communicated by said signalling means; and a disabling means, said disabling means being in nonmechanical communication with said signalling means;

wherein said differential sensing means generates a nonmechanical communication in response to the detection of hydrocarbons, a different communication in response to the detection of the nonhydrocarbon within said vessel, said disabling means disables said fuel handling equipment in response to the detection of hydrocarbon and the detection of hydrocarbon and nonhydrocarbon are separably perceptible by an attendant of said equipment.

2. The device of claim 1 wherein said hydrocarbon sensing element comprises;

a first electrode layer, said first electrode layer formed on said interior surface of said containment vessel;

a dielectric layer formed on said first electrode layer;

a second electrode layer, said second electrode layer formed on said dielectric layer;

a hydrocarbon permeable layer, said hydrocarbon permeable layer formed on said second electrode layer;

at least two leads, a first lead and a second lead, said first lead being in electrical communication with said first electrode layer, said second lead being in communication with said second electrode layer; and a source of electricity; said source of electricity supplying electrical charge to each of said leads insufficient to form an electrical current between said electrode layers solely in the presence of said dielectric layer but sufficient to form an electrical charge between said electrode layers in the presence of hydrocarbons; wherein said hydrocarbon sensing means communicates the presence of circuit between said electrode layers to said signalling means.

3. The device of claim 1 wherein said nonhydrocarbon sensing element comprises;

a first electrode layer, said first electrode layer formed on said interior surface of said containment vessel;

a dielectric layer formed on said first electrode layer;

a second electrode layer, said second electrode layer formed on said dielectric layer;

a water permeable layer, said water permeable layer formed on said second electrode layer;

at least two leads, a first lead and a second lead, said first lead being in electrical communication with said first electrode layer, said second lead being in communication with said second electrode layer; and a source of electricity; said source of electricity supplying electrical charge to each of said leads insufficient to form an electrical current between said electrode layers solely in the presence of said dielectric layer but sufficient to form an electrical charge between said electrode layers in the presence of water; wherein said nonhydrocarbon sensing means communicates the presence of circuit between said electrode layers to said signalling means.

4. The device of claim 1 further comprising a shock sensor for detecting a predetermined physical force exerted upon said equipment, said disabling means further actuated by a nonmechanical communication from said shock sensor.

5. The device of claim 1 wherein said disabling means is further responsive to a remote command.

* * * * *